United States Patent Office 2,954,659
Patented Oct. 4, 1960

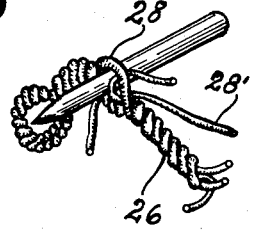
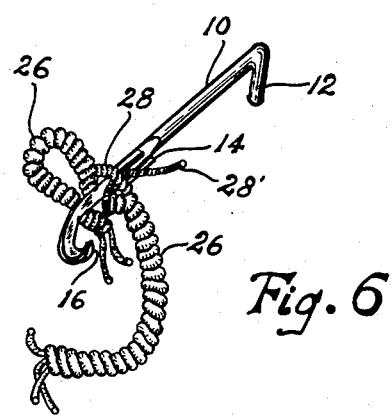
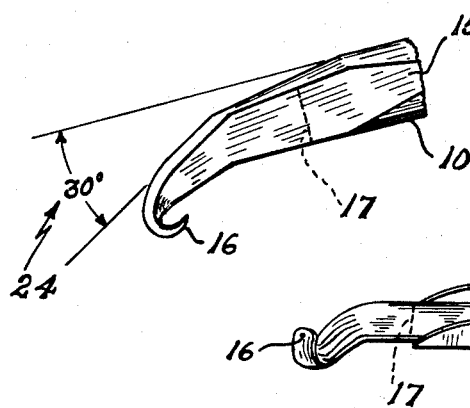
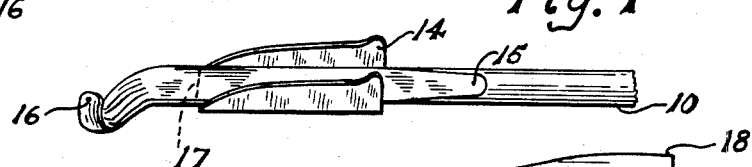
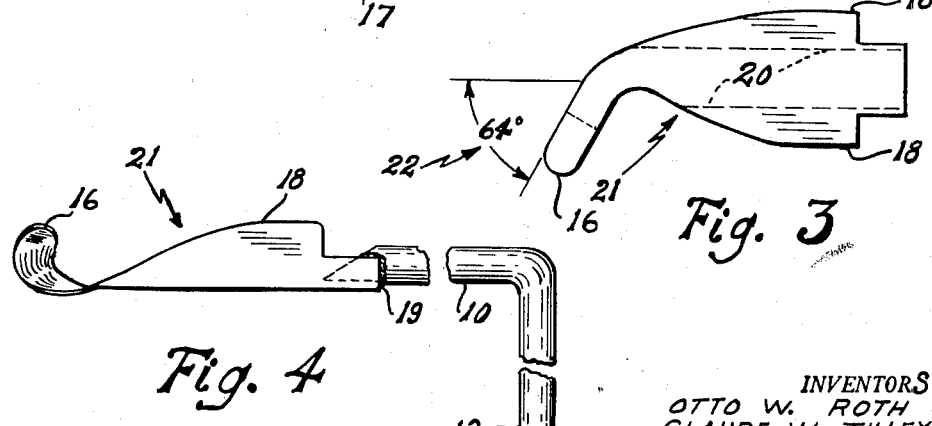

2,954,659

PICK STRAND NYLON ROPE SPLICING TOOL

Otto W. Roth, Star Rte. No. 1, Box 25-H, Littlerock, Calif., and Claude W. Tilley, Thunderbird Trailer Park, Rosamond, Calif.

Filed Sept. 25, 1959, Ser. No. 842,542

5 Claims. (Cl. 57—23)

(Granted under Title 35, U.S. Code (1952), sec. 266)

The invention described herein may be manufactured and used by or for the United States Government for governmental purposes without payment to us of any royalty thereon.

This invention relates to a cable splicing tool to replace the common marline-spike, and known variations thereof, for splicing rope and especially nylon rope used in and around airfields. It is an improvement on our application Serial Number 842,543, filed on even date, relating to a tool for splicing heavy rope or wire cable. The improvement renders the tool especially suited for use with tightly twisted nylon rope.

Around airfields, and especially around military installations, a great deal of nylon rope and cord is used. The rope is tightly twisted and being of a resilient material it is hard to splice since the strand raised by a marline-spike tends to fall back in place before the end of a loose strand can be tucked under it. This causes the operator to force the strand higher from the rope which distorts the twist and results in an inferior splice. The delicate fibres are easily damaged by this treatment and thus the splice is further weakened. Special treatment and a special tool are required to splice nylon rope.

It is an object of this invention, therefore, to provide a simple, one piece tool for splicing nylon rope.

It is a further object to provide a tool which is easy and inexpensive to manufacture.

It is a still further object to provide a tool which is simple and easy to operate and lessens fatigue of the operator.

It is another object to provide a tool which will not disturb the original twist of the rope appreciably and eliminates damage to the strand and its delicate nylon fibres.

In short it is an object of this invention to provide a tool for splicing nylon rope which will overcome the shortcomings of the common marline-spike, and other known devices which replace it.

The above and still other objects, advantages and features of our invention will become apparent upon consideration of the following detailed description of one embodiment thereof, especially when taken in conjunction with the accompanying drawings, in which:

Fig. 1 is an isometric view showing the tool assembled to the strand guide;

Fig. 2 is an isometric view showing the detail of the tip of Fig. 1;

Fig. 3 is a plan view of an alternate method of forming the tip and strand guide;

Fig. 4 is a side view showing the tool assembled to the tip formed by the alternate method of Fig. 3;

Fig. 5 is a sketch showing how the common marline-spike is used to splice a nylon rope; and Fig. 6 is a sketch showing the use of the invention in splicing a nylon rope.

In the drawings 10 designates a metal rod having a portion of one end bent preferably at a right angle forming a handle 12. A taper may be provided on both sides of said rod, lying in a plane through the handle and said rod, beginning at 15 and running to the end thereof where it is formed into a tip 16 about one thirty second of an inch thick. The tip is rounded and smoothed. The end portion of said taper forms a substantially thin surface beginning at 17 and running to the tip 16. Said tip 16 is bent on a radius to fit a strand 28 of a rope 26 to be spliced. Said thin portion of said taper is offset from the rod at an angle of between 45 and 65 degrees as shown at 22. The tip 16 is then bent up from a plane passing through said rod and said handle at an angle of approximately 30° shown at 24. This angle is important, for taken with the angle of 45 to 65 degrees at 22 it enables an operator to raise a strand of rope by turning the handle clockwise with a simple flexure of the forearm and wrist. A guide 14 of sheet metal, as shown in Fig. 1, forms a U-shape tapering from the point 17 to a depth to accommodate a strand of rope to be spliced, and may be preferably formed of separate members welded or soldered to the said rod at a point near the beginning of the said substantially thin surface at 17 or by wrapping a single sheet metal piece around said rod and securing it thereto. Said guide is tapered from zero at the point 17 to a depth sufficient to accommodate a strand of a rope to be spliced. The guide 14 is provided to slip under a looped strand while a loose strand is threaded through said guide and pulled tight. Withdrawal of the tool enables the splice to be completed.

An alternate method of forming the tool is shown in Figs. 3 and 4. Instead of tapering the rod 10 to a substantially flat surface and bending it to fit a strand of cable as shown in Figs. 1 and 2, a piece of sheet steel shown in Fig. 3, has wing portions 18 bent along the dashed bend lines 20. The tip is then formed on a radius to fit a strand of rope to be spliced. The guide 21, thus formed, is welded to the rod 10 at 19 and the tip thus formed is bent up from a plane running through the said handle 12 and the said rod at an angle of approximately 30°. This alternate method of forming the tool is merely illustrative of one cheaper method of manufacture.

As can be seen by referring to Fig. 6 it is a simple matter to splice a rope or cable with this device. It is merely necessary to insert the thin and polished tip 16 under a strand 28. The handle 12 of the tool is then turned in a clockwise direction with a natural flexure of the forearm and wrist, until the guide 14, or if the tool has been made in the alternate manner, the guide 21, has been slipped far enough under the raised strand to permit the insertion of a loose strand 28'. The strand 28' is then pulled through, the tool is twisted in the opposite direction to remove it from the rope and the first part of a splice is complete. This process is repeated until all the strands forming the rope are pulled through. The thin tip enters under a strand easily without damage to the fibers, the strand is raised just enough to permit the insertion of the loose strand and the tight twist of the rope is distorted a minimum. A stronger and more permanent splice is thus made with a minimum of effort and time as compared with the use of a bulky marline-spike which is illustrated in Fig. 5.

Although the invention has been described with reference to a particular embodiment it will be understood to those skilled in the art that the invention is capable of a variety of alternative embodiments within the spirit and scope of the appended claims.

What we claim as new is:

1. A tool for splicing rope comprising a main body portion, a handle portion at one end, the other end having a thin portion bent in a curve to fit a strand of rope to be spliced, said other end being offset from said main body portion in a plane passing through said main body portion and said handle portion and being offset in a plane perpendicular to said first-mentioned plane, and means secured to said main body portion adjacent to said other end for guiding a strand of rope to be spliced.

2. In a device as described in claim 1 wherein the said thin portion is in the form of a gradual taper from the full dimension of said main body portion.

3. A device as described in claim 1 wherein the angle of offset of said other end to said main body portion is between 45° and 65° and the angle of offset of said curved portion from said first-mentioned plane is approximately 30°.

4. A device as described in claim 1 wherein said means comprise a pair of upright members secured to said main body portion adjacent said other end, said members being tapered from the ends adjacent said other end to a height sufficient to accommodate a strand of rope.

5. A tool for splicing nylon rope comprising a metal rod having one end bent at an angle to form a handle, the other end of said rod being tapered to a substantially thin portion, the tip of said thin portion being bent on a radius to fit the outside diameter of a strand of rope to be spliced, said thin portion being offset from said rod at an angle of 45° to 65°, the thin portion containing said tip being bent up at an angle of approximately 30° from a plane passing through said rod and said handle, and a U-shaped formation tapered to a depth to accommodate a strand of rope to be spliced located adjacent said thin offset portion.

References Cited in the file of this patent

UNITED STATES PATENTS

| | | |
|---|---|---|
| 961,201 | Altheide | June 14, 1910 |
| 2,261,447 | Payne | Nov. 4, 1941 |
| 2,417,055 | Borgelt | Mar. 11, 1947 |

FOREIGN PATENTS

| | | |
|---|---|---|
| 48,513 | Sweden | Feb. 9, 1921 |